(12) United States Patent
Tagland

(10) Patent No.: US 6,527,279 B2
(45) Date of Patent: Mar. 4, 2003

(54) INTEGRATED POWERED LATHE CHUCK

(75) Inventor: Johann Tagland, Medlingen (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 09/902,498

(22) Filed: Jul. 10, 2001

(65) Prior Publication Data
US 2002/0008358 A1 Jan. 24, 2002

(30) Foreign Application Priority Data
Jul. 12, 2000 (DE) ..................................... 200 12 080 U

(51) Int. Cl.$^7$ ............................................... B23B 31/30
(52) U.S. Cl. ........................ 279/4.02; 279/126; 82/142
(58) Field of Search ............................ 279/2.06, 2.07, 279/2.09, 4.01, 4.02, 4.1–4.12, 126; 82/142, 147; 409/231–233

(56) References Cited

U.S. PATENT DOCUMENTS

| | | | |
|---|---|---|---|
| 391,585 A | * 10/1888 | Cooper | 279/4.01 |
| 3,097,857 A | * 7/1963 | Morgan | 279/4.12 |
| 3,501,159 A | * 3/1970 | Scharfen | 279/4.12 |
| 4,443,021 A | * 4/1984 | Buchholz et al. | 279/4.02 |
| 4,493,242 A | * 1/1985 | Rohm | 279/4.02 |
| 4,995,303 A | * 2/1991 | Rohm | 279/4.02 |
| 5,549,427 A | * 8/1996 | Hiestand | 409/233 |
| 5,901,967 A | * 5/1999 | Morisaki | 279/4.12 |
| 5,971,380 A | * 10/1999 | Hebener | 269/20 |
| 6,341,553 B1 | * 1/2002 | Rohm | 279/4.02 |

FOREIGN PATENT DOCUMENTS

| | | | |
|---|---|---|---|
| DE | 196 52 664 | 1/1998 | |
| EP | 344451 A2 | * 12/1989 | 279/4.12 |
| JP | 63099110 A | * 4/1988 | 279/4.01 |
| JP | 01264704 A | * 10/1989 | 279/4.01 |

* cited by examiner

Primary Examiner—Steven C. Bishop
(74) Attorney, Agent, or Firm—Herbert Dubno

(57) ABSTRACT

An integrated power chuck assembly for a lathe has a hollow lathe spindle of a diameter sufficient to accommodate at least the actuating cylinder and a multiple medium feed device and preferably at least part of the stroke-control device which can include at least one sensor for the position of the piston.

11 Claims, 5 Drawing Sheets

INTEGRATED POWERED LATHE CHUCK

FIELD OF THE INVENTION

The present invention relates to an integrated chuck system for a lathe which is comprised of a number of components and can be mounted on the machine spindle of a lathe for engagement with a workpiece and for disengagement from the workpiece. More particularly, the invention relates to a chuck system of this type which has, in addition to a jaw chuck whose jaws may be moved into and out of engagement with the workpiece, an actuating cylinder for shifting the jaws of the chuck, a multiple medium feed device for distributing a hydraulic medium to the cylinder, and a stroke-control system for monitoring the axle position of the piston of the actuating cylinder and thus the positions of the jaws of the chuck.

BACKGROUND OF THE INVENTION

Fine-adjustment and automatic or powered lathe chucks, so-called integrated chuck systems, have been provided heretofore for lathes and have generally comprised the jaw chuck itself which is provided on the chuck body. This chuck is usually mounted on the free axially front end of the lathe or machine spindle so that it can rotate with the latter.

In modern lathes, the machine spindle is often directly driven and frequently can be constituted as a hollow spindle.

The jaws of the chuck have in the past been controlled by an actuating cylinder to which a hydraulic fluid can be fed by a multiple medium feed unit also mounted, as described in DE 196 52 664, on the spindle, but usually at the rear end thereof. The stroke-control system, if provided, likewise is mounted at the rear end of the spindle. The result is an axial stacking of the chuck at one end of the spindle, the spindle between the ends thereof, and the actuating cylinder, the multiple-medium feed device and the stroke-control system at the opposite axial end of the spindle such that the length dimensions or the dimensions of these elements in the axial direction and in the machine. The result is a lathe head which is very long and, in the case of so-called synchronized spindle machines which are used for bearing machines in crank shaft production, creates an overall machine length which is problematical. Since the plant must provide space for such machines and space is at a premium in these plants, problems have been encountered.

OBJECTS OF THE INVENTION

It is the principal object of the present invention to provide a so-called integrated chuck system, i.e. a fine-adjustment automatic or powered chuck system of the aforedescribed type, having in addition to the chuck body and the jaws, an actuating cylinder and a stroke-control system with a monitor for the piston position of that cylinder, whereby the spatial requirements are reduced.

Another object of this invention is to provide an improved chuck system of the aforedescribed type which is free from drawbacks of the prior art.

SUMMARY OF THE INVENTION

These objects and others which will become apparent hereinafter are attained, in accordance with the invention by integrating one or more of the components associated with the chuck in the chuck system within the hollow spindle. According to the invention, the component or components which are integrated within the hollow spindle can be the actuating cylinder and its piston or pistons, the stroke-control device and/or the position sensor for the position of the piston of that cylinder.

According to the invention, the hollow spindle has an internal diameter which is sufficient to accommodate the component or components received therein. The components may be individually or collectively received in the hollow spindle.

The invention thus provides the advantage that the overall length of the head of the lathe is no longer the additive combination of the lengths of the chuck body, the spindle and the other components mentioned since these components are in whole or in part incorporated into the hollow spindle.

Most advantageously the hollows spindle accommodates within its interior and between its ends, the actuating cylinder and the multiple medium feed device.

According to a feature of the invention, the ends of the actuating cylinder and the multiple medium feed device which are turned toward one another are so configured that they can mutually engage after they are inserted from opposite axial ends into the machine spindle and meet within the spindle between the ends thereof.

The chuck, actuating cylinder, multiple medium feed and stroke-control system can be combined in a complete system on a lathe spindle in which the actuating cylinder, multiple medium feed device and the stroke-control system, together with the sensor for the position of the piston and that cylinder are all located within the spindle.

The assembly, when constructed in this manner, has the embodiment advantage that access is only required to one end of the machine spindle since the application of the chuck body to the end of the spindle is the only work required at the spindle end.

Advantageously, between the piston of the actuating cylinder and the chuck, a bayonet coupling is provided and the chuck can be provided with fastening means for securing the chuck body to the actuating cylinder. In this embodiment, it may be desirable to push the actuating cylinder into the machine spindle and to secure it provisionally in place so that it can be connected by a bayonet coupling with the chuck, thereby affixing the assembly to the chuck and the actuating cylinder to the machine spindle.

From the point of view of further shortening, the axial length of the total system and the head of the lathe, the stroke-control system can be included at least over part of its length in the hollow spindle and the degree of integration of the components in the hollow spindle over the system in which only the actuating cylinder and the medium distribution device are received therein, is thereby greater.

The multiple medium distributor can be mounted on the stroke-control rod and inserted into the hollow cylinder together with it. Advantageously, the distributor housing can be held against rotation by the stirrup which carries the sensor of the stroke-control system. The stirrup thus holds the distributor against rotation by the spindle.

The power chuck assembly for a lathe according the invention thus can comprise:

a hollow lathe spindle;

a jaw chuck affixed on one end of the spindle and comprising a chuck body and jaws movably mounted on the chuck body;

an actuating device for the jaws of the chuck including an actuating cylinder having a piston operatively connected to the jaws;

a multiple medium feed device for supplying hydraulic fluid to the actuating cylinder; and a stroke control device including at least one sensor for a position of the piston an thereby of the jaws, at least one of the devices being integrated into and received in an interior of the hollow spindle, the spindle having an inner diameter enabling the one of the devices to be accommodated in the spindle.

The hollow spindle therefore has an inner diameter sufficient to accommodate the actuating cylinder and multiple medium feed device which are both received in the hollow spindle. The mutually facing ends of the actuating cylinder and the multiple medium feed device are provided with connecting means for interconnecting the actuating cylinder and the multiple medium feed device and enabling insertion of the actuating cylinder and the multiple medium feed device into the hollow spindle from opposite ends thereof.

The chuck and piston are connected by a bayonet connection and preferably the stroke-control device extends over at least part of its length in the hollow spindle.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
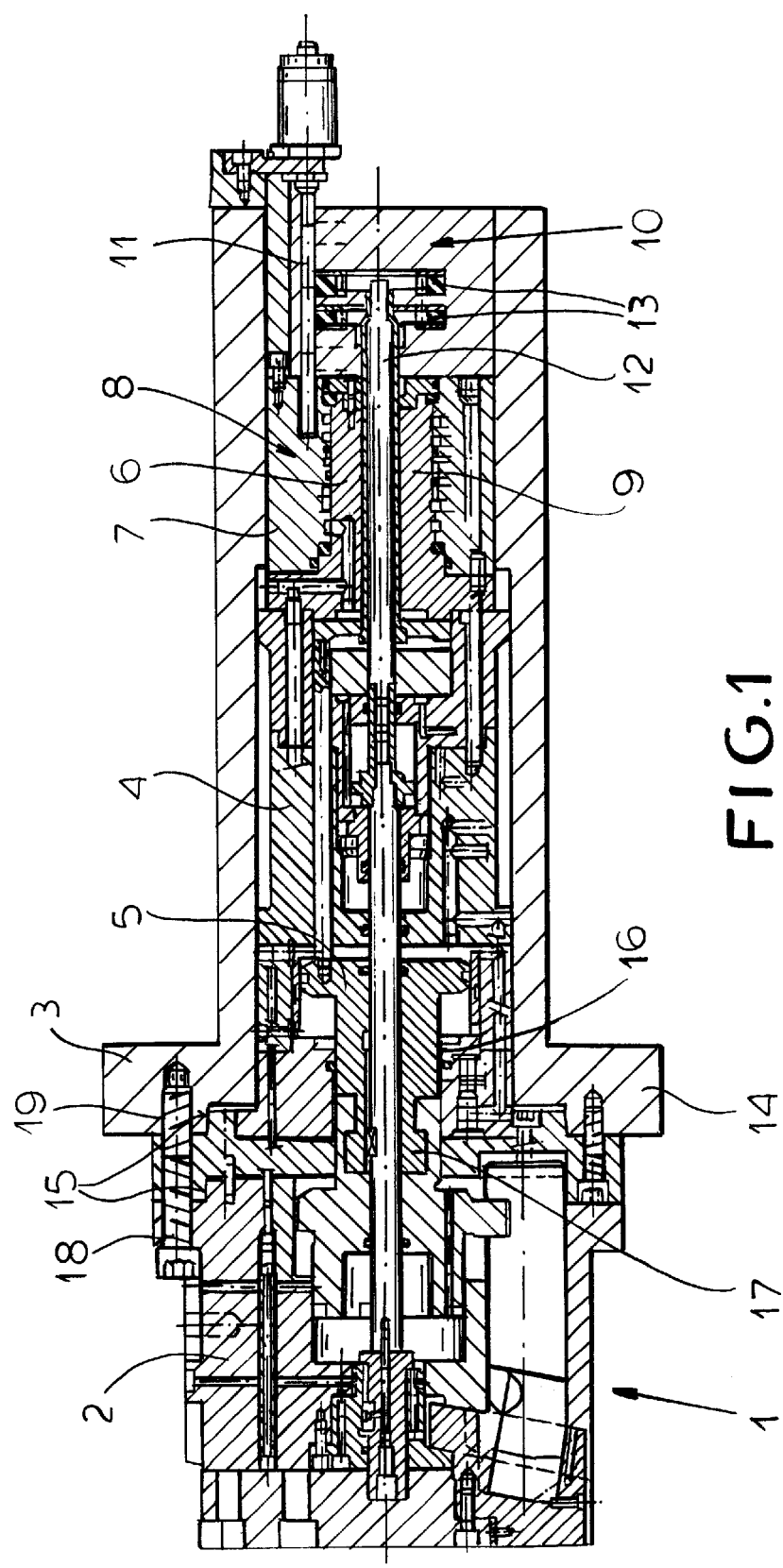
FIG. 1 is a longitudinal section, greatly simplified, through the integrated chuck system of the invention.
Figure 2:
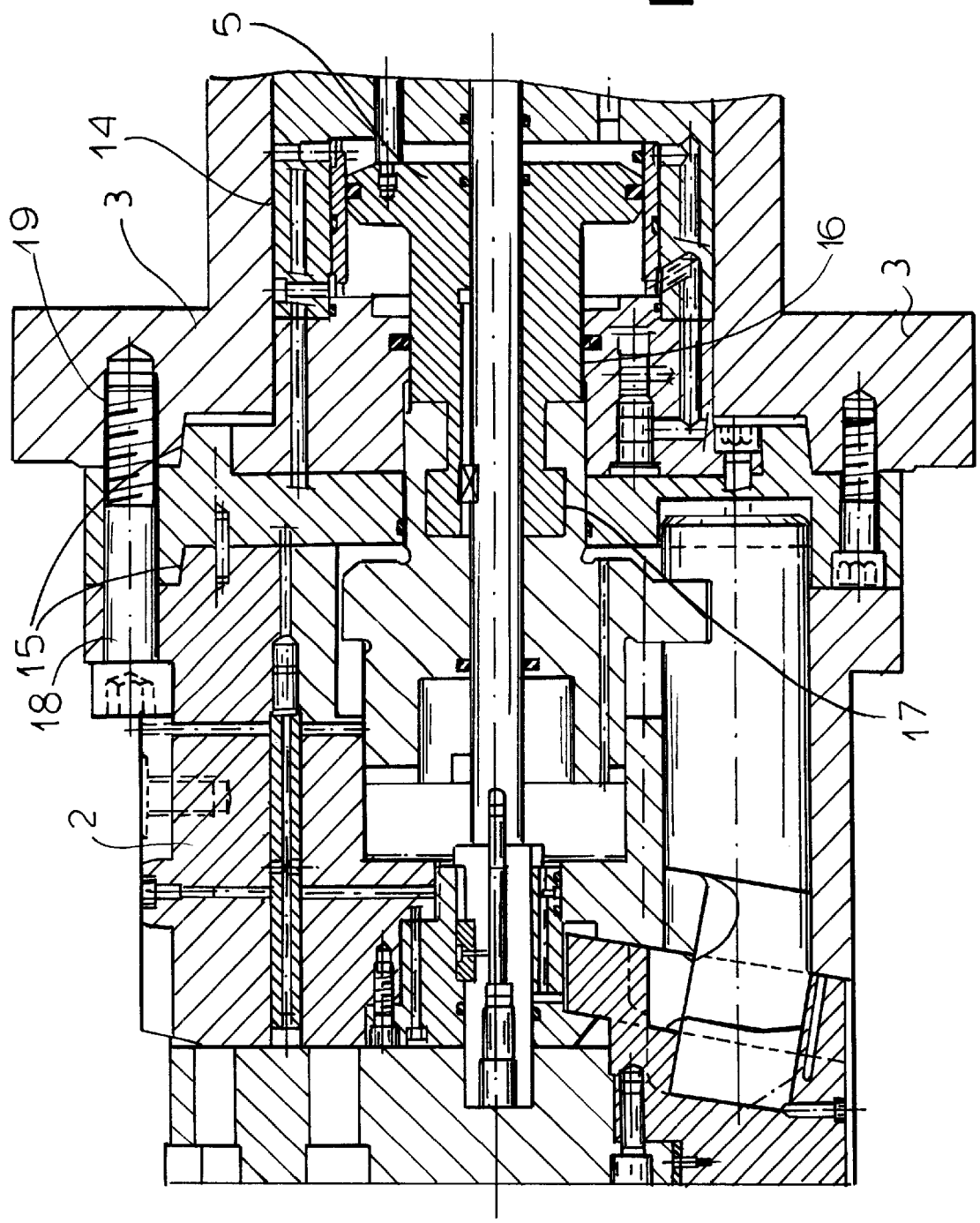
FIG. 2 is an enlarged detail view of the front free end of the chuck system.
Figure 3:
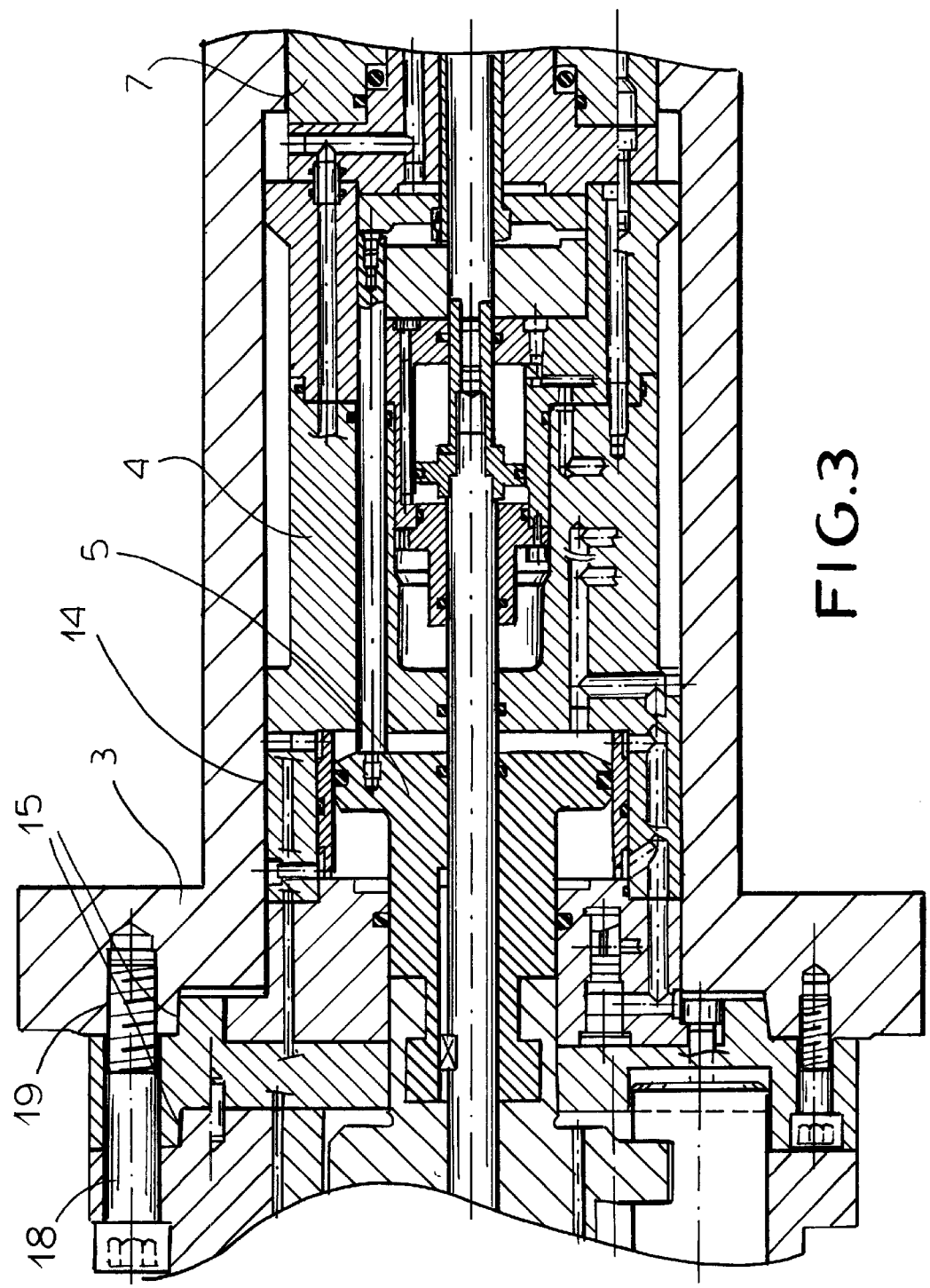
FIG. 3 is an enlarged detail view of the middle section of the chuck system.
Figure 4:
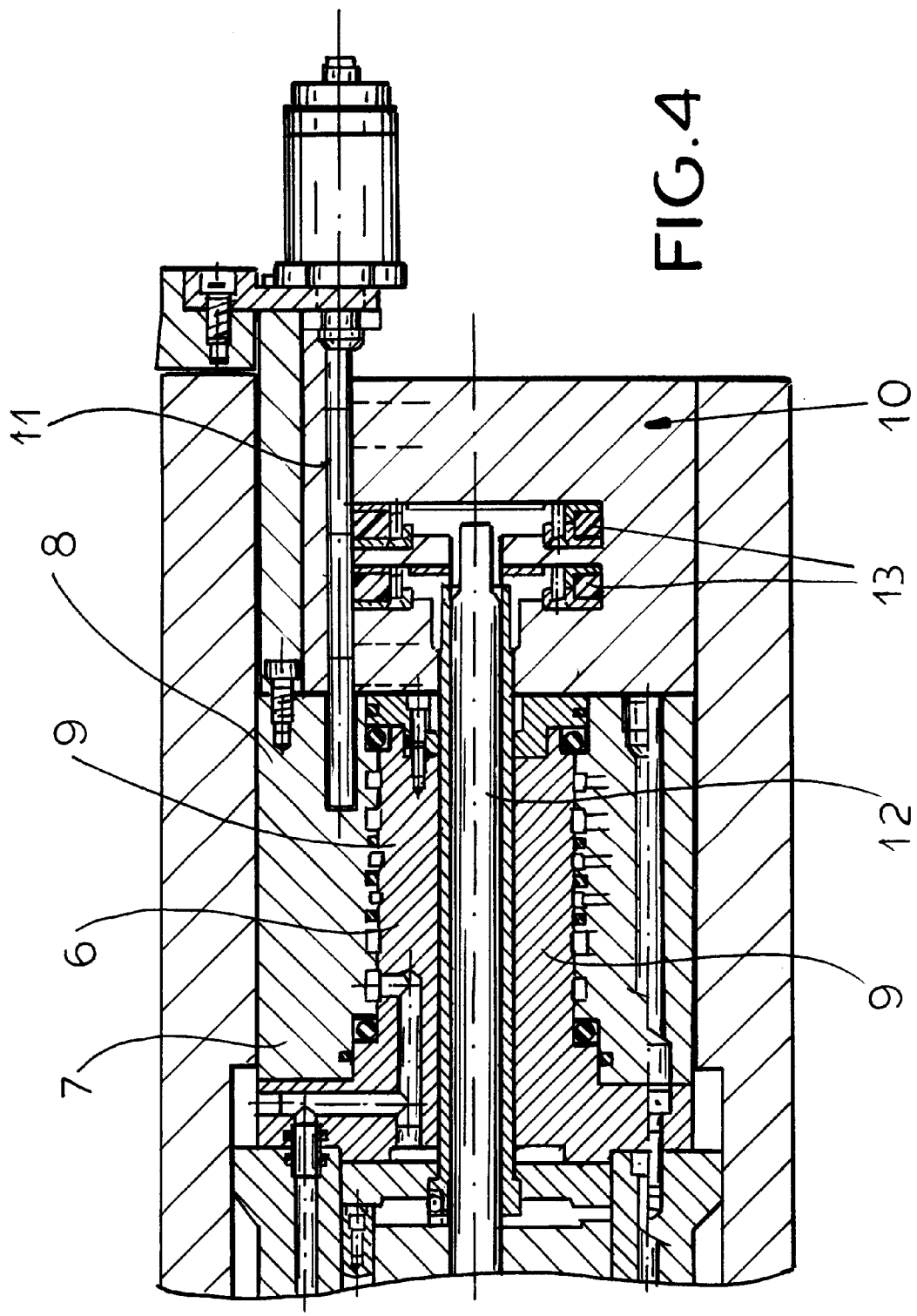
FIG. 4 is an enlarged detail view of the rearward end of the chuck system.

FIG. 1 provides an overview of a integrated chuck system 1 according to the invention which can be mounted on a lathe which has not been illustrated in detail and of which only the lathe spindle has been illustrated. The axial sections of this chuck system have been shown in greater detail in FIGS. 2–4, the view of which partly overlap and which separately show the components of the integrated chuck system.

The integrated chuck system 1 encompasses a jaw chuck 2 which has not been shown in any detail and which can be mounted on the machine spindle 3 of the lathe so as to be rotationally fixed thereto, i.e. so as to rotate with that spindle 3. The adjustment of the chuck 2 is effected by an actuating cylinder 4 which rotates with the machine spindle 3 and which can be a multipartite actuating cylinder with an axially shiftable piston also rotating with the cylinder and the machine spindle and a multiple medium feed system represented generally at 6 and through which a hydraulic medium can be fed to the several parts of the cylinder. The medium feed 6 can comprise a distributor 7 which can encompass a distributor side housing 8 carrying the connections for the working medium, i.e. the hydraulic fluid, and a distributor shaft 9 which is axially bolted to the rear wall of the actuating cylinder 4 and is so arranged on the distributor housing 8 that the distributor shaft 9 can rotate therein. Finally, the integrated chuck system 1 comprises a stroke control system 10 for monitoring the axial position of piston 5 associated with the actuating cylinder 4 and thus the positions of the jaws of the chuck 2. The monitoring element can be the sensor 11 which can operate under the magneto striction principle and has been illustrated diagrammatically in the drawing at 11. This sensor can be fixed on a stirrup mounted on a rear wall of the machine spindle and can cooperate with a rotating annular magnetic disk or two such disks. The disks are, in turn, mounted on a stroke-control rod shiftable relative to the piston 5. To achieve a relatively short overall axial length, the machine spindle 3 is formed as a hollow spindle 14 which has a diameter enabling the actuating cylinder 4 and the multiple medium feed 6 as well as the stroke-control system 10 to be accommodated in the hollow spindle 14.

In order to hold the integrated chuck system together, initially the actuating cylinder 4 is affixed to the machine spindle 3 so that a short conical flange 15 engages forwardly in the hollow spindle 14 and is affixed to the machine spindle 3. The chuck 2 can then be threaded over the bayonet-like piston neck 16 of the piston 5 of the actuating cylinder 4. The bayonet connection 17 is also formed between the piston 5 of the actuating cylinder 4 and the chuck 2.

In addition, the chuck 2 is provided with fastening means 18 in the form of screws which can secure the chuck 2 with the actuating cylinder 4 onto the machine spindle 3. These screws are received in screw pockets 19 of the machine spindle 3.

On the ends of the actuating cylinder 4 and the multiple medium feed 6 which are turned toward one another connecting means enabling their insertion from the opposite axial ends of the machine spindle are arranged so that the multiple medium feeder 6 will be inserted from the rear end of the machine spindle 3 toward the cylinder 4 and over the control rod 12 and then into the hollow spindle 14 where it can engage the actuating cylinder 4. The latter was previously inserted through the left hand end of the hollow spindle 14. The angular position of the distributor housing is fixed by the wall of the machine spindle and the stirrup carrying the sensor 11 against relative rotation.

Figure 5:
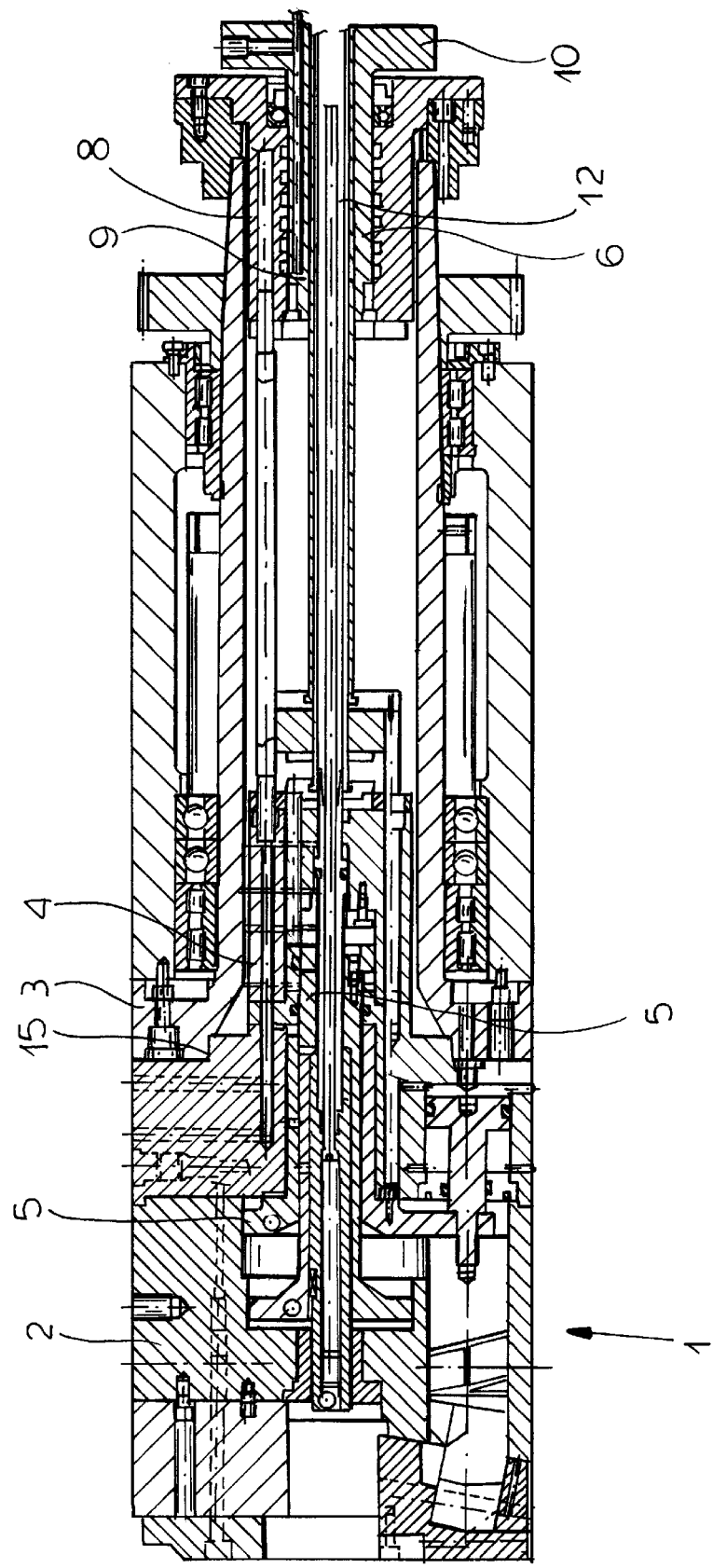
FIG. 5 is a view similar to FIG. 1 of an alternative embodiment with an axially shortened machine spindle.

In FIG. 5 an embodiment is shown in which the multiple medium feeder 6 is not fully accommodated in the hollow spindle 14 but the rear projects from the rear spindle end or, stated otherwise, reaches into the rear portion of the spindle bore from the exterior. In this embodiment the hollow spindle can be shortened and does not have to occupy the same amount of space as would be required if the multiple medium feed 4 would be fully received therein.

In operation, the piston 5 of the actuating cylinders 4 displace the rod 12 to shift the jaws of the chuck into or out of engagement with a workpiece. The hydraulic fluid is fed to the distribution unit 6 in accordance with the principles of such automatic or power-operated chucks and the position of the jaw is determined by the position of the rod as detected by the sensor 11. The sensor 11 and the power control system can be connected in a feedback arrangement to ensure proper positioning of the jaws and engagement thereof or disengagement from the workpiece with fine adjustability. Reference may be had in this connection to DE 196 52 664 C.

What is claimed is:

1. A power chuck assembly for a lathe, comprising:
   a hollow lathe spindle;
   a jaw chuck affixed on one end of said spindle and comprising a chuck body and jaws movably mounted on said chuck body;
   an actuating device for said jaws of said chuck including an actuating cylinder having a piston operatively connected to said jaws;

a multiple medium feed device for supplying hydraulic fluid to said actuating cylinder; and a stroke control device including at least one sensor for a position of said piston and thereby of said jaws, at least one of said devices being integrated into and received in an interior of said hollow spindle, said spindle having an inner diameter enabling said one of said devices to be accommodated in said spindle, said hollow spindle having an inner diameter sufficient to accommodate said actuating cylinder and said multiple medium feed device in said hollow spindle, said actuating cylinder and said multiple medium feed device being received in said hollow spindle.

2. The power chuck assembly defined in claim 1 wherein mutually facing ends of said actuating cylinder and said multiple medium feed device are provided with connecting means for interconnecting said actuating cylinder and said multiple medium feed device and enabling insertion of said actuating cylinder and said multiple medium feed device into said hollow spindle from opposite ends thereof.

3. The power chuck assembly defined in claim 2 wherein said chuck and said piston are interconnected by a bayonet connection and said chuck body is connected to said spindle for rotation therewith by respective fasteners.

4. The power chuck assembly defined in claim 3 wherein said stroke control device extends over at least part of its length in said hollow spindle.

5. The power chuck assembly defined in claim 4 wherein said multiple medium feed device is fitted on a rod forming part of said stroke control device and connected to said piston and is inserted into said hollow spindle together with said rod.

6. The power chuck assembly defined in claim 5 wherein said multiple medium feed device comprises a distributor having a distributor housing and is received in said hollow spindle, said sensor being mounted on a stirrup engaging said housing and holding said housing against rotation in said spindle.

7. A power chuck assembly for a lathe, comprising:

a hollow lathe spindle;

a jaw chuck affixed on one end of said spindle and comprising a chuck body and jaws movably mounted on said chuck body;

an actuating device for said jaws of said chuck including an actuating cylinder having a piston operatively connected to said jaws;

a multiple medium feed device for supplying hydraulic fluid to said actuating cylinder; and a stroke control device including at least one sensor for a position of said piston an thereby of said jaws, at least one of said devices being integrated into and received in an interior of said hollow spindle, said spindle having an inner diameter enabling said one of said devices to be accommodated in said spindle, mutually facing ends of said actuating cylinder and said multiple medium feed device being provided with connecting means for interconnecting said actuating cylinder and said multiple medium feed device and enabling insertion of said actuating cylinder and said multiple medium feed device into said hollow spindle from opposite ends thereof.

8. The power chuck assembly defined in claim 7 wherein said chuck and said piston are interconnected by a bayonet connection and said chuck body is connected to said spindle for rotation therewith by respective fasteners.

9. A power chuck assembly for a lathe, comprising:

a hollow lathe spindle;

a jaw chuck affixed on one end of said spindle and comprising a chuck body and jaws movably mounted on said chuck body;

an actuating device for said jaws of said chuck including an actuating cylinder having a piston operatively connected to said jaws;

a multiple medium feed device for supplying hydraulic fluid to said actuating cylinder; and a stroke control device including at least one sensor for a position of said piston an thereby of said jaws, at least one of said devices being integrated into and received in an interior of said hollow spindle, said spindle having an inner diameter enabling said one of said devices to be accommodated in said spindle, said stroke control device extending over at least part of its length in said hollow spindle.

10. A power chuck assembly for a lathe, comprising:

a hollow lathe spindle;

a jaw chuck affixed on one end of said spindle and comprising a chuck body and jaws movably mounted on said chuck body;

an actuating device for said jaws of said chuck including an actuating cylinder having a piston operatively connected to said jaws;

a multiple medium feed device for supplying hydraulic fluid to said actuating cylinder; and a stroke control device including at least one sensor for a position of said piston an thereby of said jaws, at least one of said devices being integrated into and received in an interior of said hollow spindle, said spindle having an inner diameter enabling said one of said devices to be accommodated in said spindle, said multiple medium feed device being fitted on a rod forming part of said stroke control device and connected to said piston, said multiple medium feed device being inserted into said hollow spindle together with said rod.

11. A power chuck assembly for a lathe, comprising:

a hollow lathe spindle;

a jaw chuck affixed on one end of said spindle and comprising a chuck body and jaws movably mounted on said chuck body;

an actuating device for said jaws of said chuck including an actuating cylinder having a piston operatively connected to said jaws;

a multiple medium feed device for supplying hydraulic fluid to said actuating cylinder; and a stroke control device including at least one sensor for a position of said piston an thereby of said jaws, at least one of said devices being integrated into and received in an interior of said hollow spindle, said spindle having an inner diameter enabling said one of said devices to be accommodated in said spindle, said multiple medium feed device comprising a distributor having a distributor housing and is received in said hollow spindle, said sensor being mounted on a stirrup engaging said housing and holding said housing against rotation in said spindle.

* * * * *